US008667841B1

(12) United States Patent
Noya et al.

(10) Patent No.: US 8,667,841 B1
(45) Date of Patent: Mar. 11, 2014

(54) GLOVEBOX AIR INTAKE EMERGENCY SAFETY SHUTOFF

(75) Inventors: Geoge Noya, Bel Air, MD (US); Luis Enrique Faure, Abingdon, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 218 days.

(21) Appl. No.: 13/443,370

(22) Filed: Apr. 10, 2012

Related U.S. Application Data

(60) Provisional application No. 61/493,714, filed on Jun. 6, 2011.

(51) Int. Cl.
*G01F 19/00* (2006.01)
(52) U.S. Cl.
USPC .......................................................... 73/426
(58) Field of Classification Search
USPC .......................................................... 73/426
See application file for complete search history.

(56) References Cited

U.S. PATENT DOCUMENTS

| | | | |
|---|---|---|---|
| 7,985,382 B1* | 7/2011 | Henry et al. | 422/291 |
| 8,337,776 B1* | 12/2012 | D'Onofrio et al. | 422/500 |
| 2013/0199500 A1* | 8/2013 | Matos-Cuevas | 123/47 R |

* cited by examiner

*Primary Examiner* — Lisa Caputo
*Assistant Examiner* — Jamel Williams
(74) *Attorney, Agent, or Firm* — Ulysses John Biffoni

(57) ABSTRACT

A glovebox air intake emergency safety shutoff system includes a glovebox; a first manual valve operatively connected to the glovebox, wherein the first manual valve articulates between an open position and a closed position; an automatic valve operatively connected to the manual valve, wherein the automatic valve articulates between an open position and a closed position; an air intake component that inputs air into the glovebox; an air exhaust component that discharges air from the glovebox; and a pressure monitor that detects a level of pressure in the glovebox. The pressure monitor includes a pressure sensor that measures a pressure in the glovebox and transmits a signal associated with the measured pressure; and a pressure controller that receives the signal and responds according to the measured pressure. The pressure controller operatively closes the automatic valve upon the measured pressure increasing above a predetermined limit.

20 Claims, 3 Drawing Sheets

GLOVEBOX AIR INTAKE EMERGENCY SAFETY SHUTOFF

CROSS REFERENCE TO RELATED APPLICATION

This application claims the benefit of U.S. Provisional Patent Application No. 61/493,714 filed on Jun. 6, 2011, the contents of which, in its entirety, is herein incorporated by reference.

GOVERNMENT INTEREST

The invention described herein may be manufactured, used, and/or licensed by or for the United States Government.

BACKGROUND

1. Technical Field

The embodiments herein generally relate to emergency control mechanisms, and, more particularly, to an emergency safety shutoff system for a glovebox air intake.

2. Description of the Related Art

Environmental accidents, toxic chemical spills, and testing to support verification inspections are examples of situations where chemical and biological testing may be required. Gloveboxes are used for such testing. The availability of safe, reliable, and efficient containment vessels, such as gloveboxes and fume hoods, for conducting environmental tests help to protect the investigators and preserve the evidentiary value of the collected materials and the on-site tests.

The glovebox serves as engineering control and primary protection during a hazardous test operation. During the test, in the event of pressure loss due to power failure or exhaust blower malfunction, there is a potential for containment loss through the air intake valve which would allow for hazardous materials to enter into the operators breathing zone. It is desirable to eliminate the potential hazard with an improved glovebox system.

SUMMARY

In view of the foregoing, an embodiment herein provides a glovebox air intake emergency safety shutoff system comprising a first manual valve configured to operatively connect to a glovebox, wherein the first manual valve articulates between an open position and a closed position; an automatic valve operatively connected to the manual valve, wherein the automatic valve articulates between an open position and a closed position; an air intake component configured to input air into the glovebox; an air exhaust component configured to discharge air from the glovebox; and a pressure monitor configured to detect a level of pressure in the glovebox. The pressure monitor may comprise a pressure sensor configured to measure a pressure in the glovebox and transmit a signal associated with the measured pressure; and a pressure controller that receives the signal and responds according to the measured pressure. The pressure controller may operatively close the automatic valve upon the measured pressure increasing above a predetermined limit. The pressure controller may use an external device to actuate the automatic valve.

The external device may comprise any of a relay and a solenoid. The automatic valve may close pneumatically or electrically. The automatic valve may open upon the measured pressure reaching the predetermined limit. The system may further comprise an airlock component configured to operatively connect to the glovebox. The system may further comprise a plurality of pipes configured to operatively connect each of the air intake component and the air exhaust component to any of the glovebox and the airlock component. The system may further comprise an air inlet plenum operatively connected to the air intake component; and an air exhaust plenum operatively connected to the air exhaust component. The system may further comprise a second manual valve operatively connected to the air exhaust component. The system may further comprise a third manual valve operatively connected to the air inlet plenum; and a fourth manual valve operatively connected to the air exhaust plenum.

Another embodiment provides, an apparatus comprising a negative pressurized glovebox; a support structure that holds the glovebox; an air inlet plenum operatively connected to the glovebox; a first manual valve operatively connected to the air inlet plenum, wherein the first manual valve articulates between an open position and a closed position; an automatic valve operatively connected to the manual valve, wherein the automatic valve articulates between an open position and a closed position; an air intake component that inputs air into the negative pressurized glovebox; an air exhaust component that discharges air from the negative pressurized glovebox; a pressure sensor that measures a pressure in the glovebox and transmits a signal associated with the measured pressure; a pressure controller that receives the signal and responds according to the measured pressure; and an external device operatively connected to the pressure controller, wherein the external device operatively closes the automatic valve upon the measured pressure increasing above a predetermined limit.

The external device may comprise any of a relay and a solenoid. The external device may close the automatic valve pneumatically or electrically. The external device may open the automatic valve upon the measured pressure reaching the predetermined limit. The apparatus may further comprise an airlock component operatively connected to the glovebox. The apparatus may further comprise a plurality of pipes operatively connecting each of the air intake component and the air exhaust component to any of the glovebox and the airlock component. The apparatus may further comprise an air exhaust plenum operatively connected to the glovebox and the air exhaust component, wherein the air inlet plenum is operatively connected to the air intake component. The apparatus may further comprise a third manual valve operatively connected to the air inlet plenum; and a fourth manual valve operatively connected to the air exhaust plenum.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
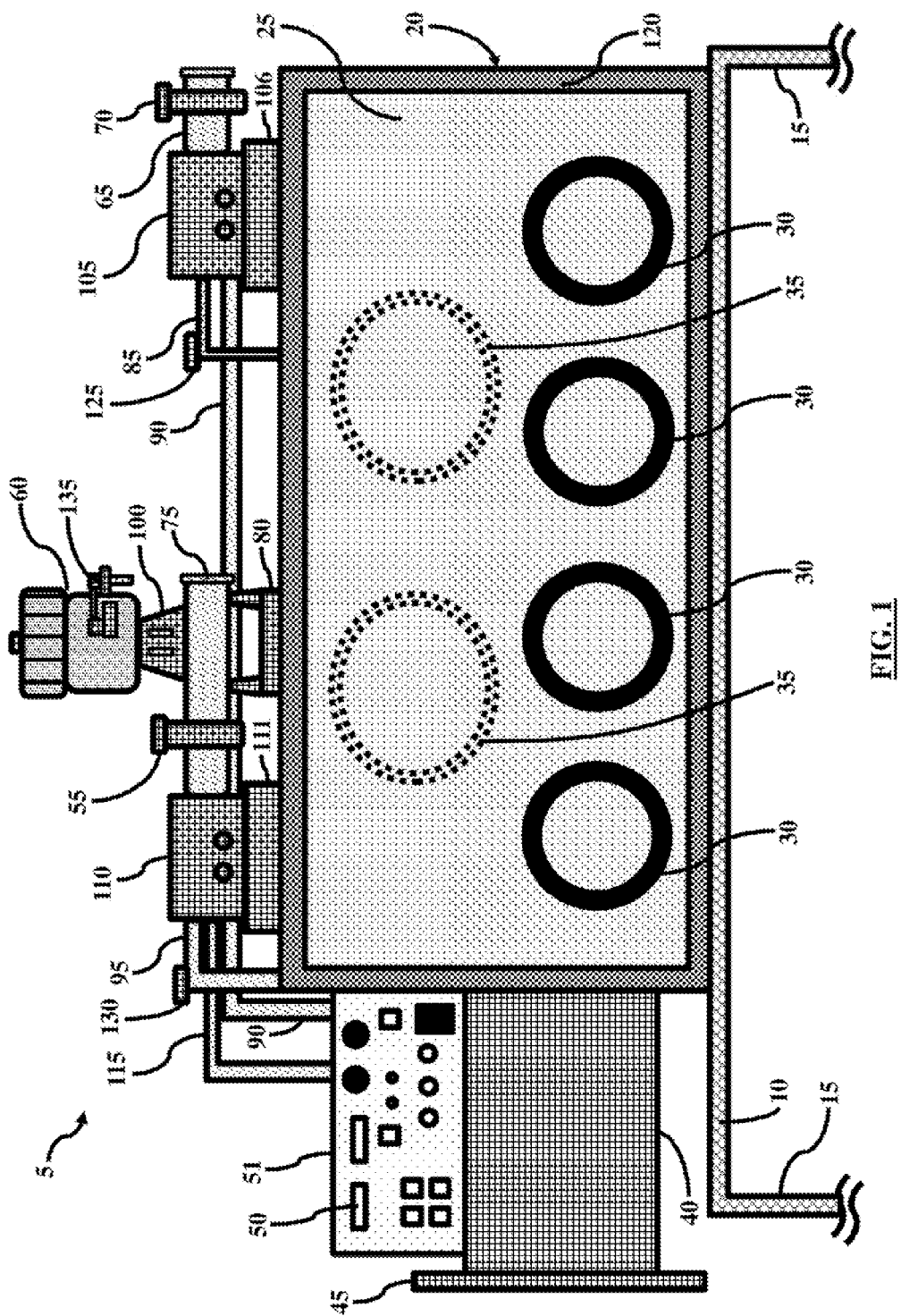
FIG. 1 illustrates a front view of a glovebox emergency shutoff apparatus according to an embodiment herein.
Figure 2:
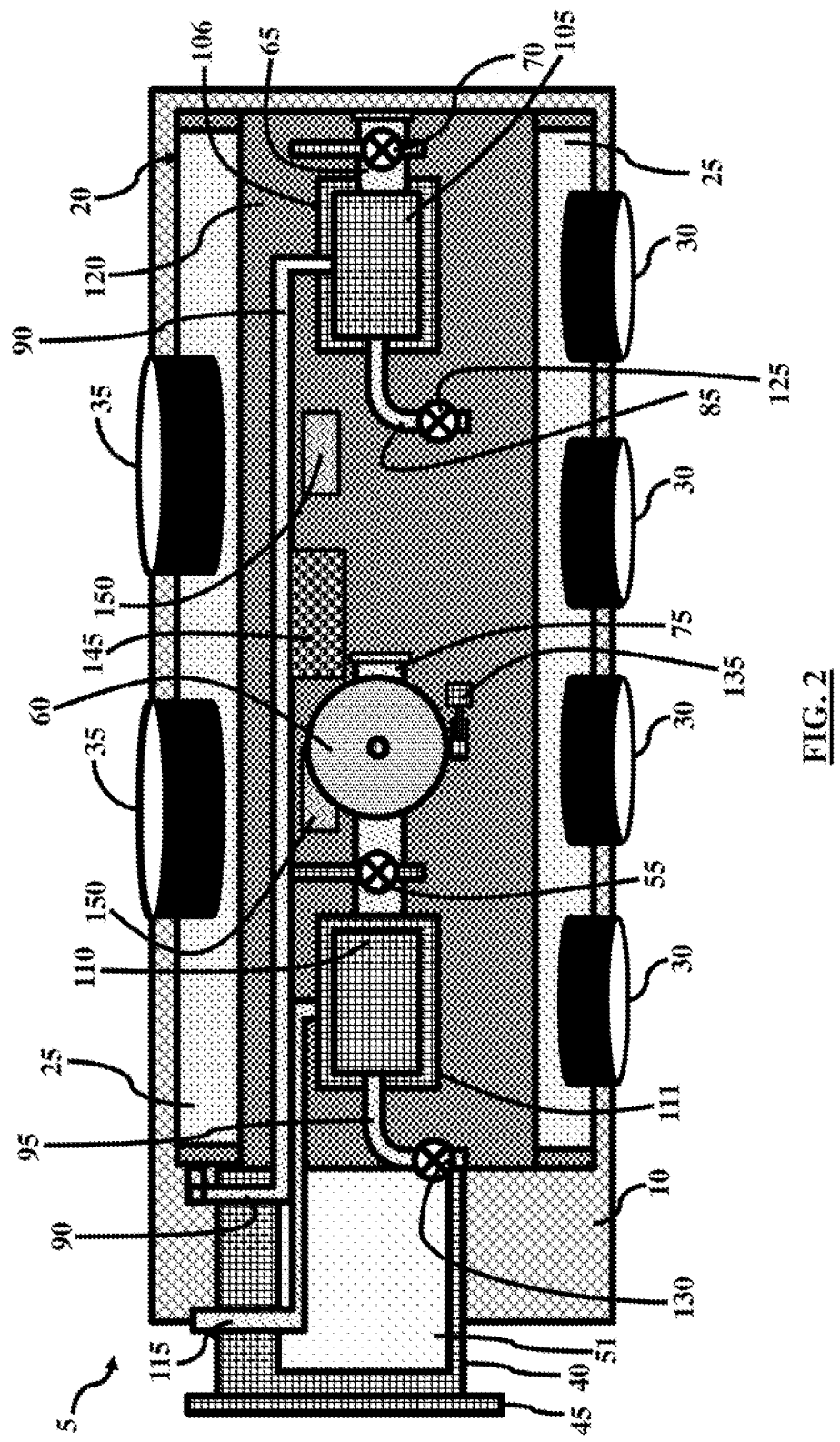
FIG. 2 illustrates a top view of the glovebox emergency shutoff apparatus of FIG. 1 according to an embodiment herein.
Figure 3:
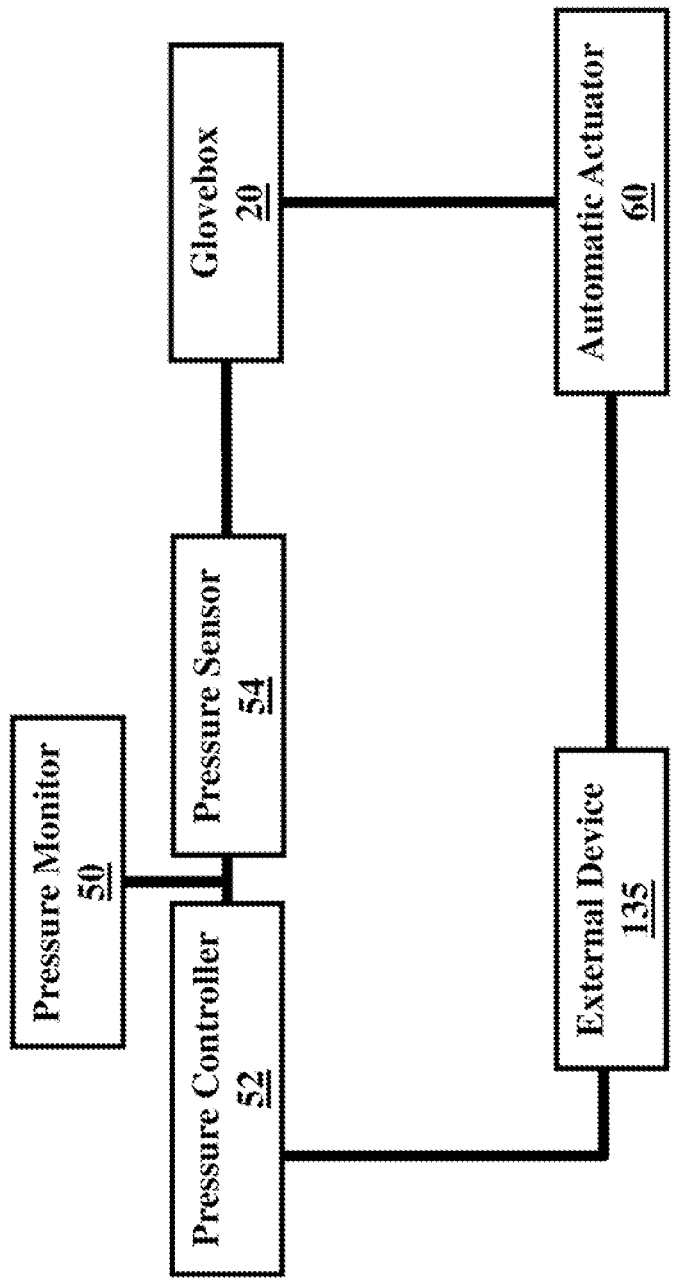
FIG. 3 illustrates a block diagram of a system according to an embodiment herein.

The embodiments herein provide an emergency safety shutoff system for a glovebox air intake. The system allows for complete containment in the event of glovebox pressure loss. This enhances safety for the operator when working with dangerous materials. Referring now to the drawings, and more particularly to FIGS. 1 through 3, where similar reference characters denote corresponding features consistently throughout the figures, there are shown preferred embodiments.

As mentioned, the glovebox serves as engineering control and primary protection during a hazardous test operation. During the test, in the event of pressure loss due to power failure or exhaust blower malfunction, there is a potential for containment loss through the air intake valve which would allow for hazardous materials to enter into the operators breathing zone. To eliminate the potential hazard, the glovebox is equipped with a pressure monitor and an automatic valve. The pressure monitor continuously monitors glovebox pressure and if the pressure drops below the set limit, the automatically actuated valve mounted to the air intake immediately closes, thereby isolating the glovebox environment and preventing the potential release of hazardous materials.

FIGS. 1 and 2 illustrate a front view and top view, respectively, of a glovebox emergency shutoff apparatus 5 according to an embodiment herein. A glovebox 20 is shown positioned on a table support 10 having legs 15. The glovebox 20 is used for handling hazardous materials, which are maintained at a lower pressure than the surrounding atmosphere so that microscopic leaks result in air intake rather than hazard outflow/exhaust. The glovebox 20 comprises a frame 120 that supports a window 25 with glove holes 30, 35 embedded therein. An airlock component 40 comprising a door 45 is adjacent to the glovebox 20. The glovebox 20 may also include another door (not shown) positioned on a side of the glovebox 20 opposite to the airlock component 40. The top of the glovebox 20 includes an access plate 145 and a plurality of electrical outlets 150.

The apparatus 5 further includes a valve assembly 100 and an air intake component 75 supported by a support member 80 and operatively connected to an air inlet plenum 110. Pipe 95 is connected to air inlet plenum 110 and the associated valve 130 is used to attach an external decontaminating system (not shown) to glovebox 20. A high-efficiency particulate air (HEPA) filter 111 is attached to air inlet plenum 110 that allows connection to the interior of the glovebox 20, wherein all air entering at air intake component 75 is HEPA filtered before entering the glovebox 20. A pipe 115 connects the air inlet plenum 110 to the airlock component 40. A manual valve 55 controls the flow of air through the air intake component 75. An exhaust component 65 is operatively connected to an air exhaust plenum 105. Pipe 85 is connected to air exhaust plenum 105 and the associated valve 125 is used to attach an external decontaminating system (not shown) to glovebox 20. A HEPA filter 106 is attached to air exhaust plenum 105 that allows connection to the interior of glovebox 20, wherein all air exiting at air exhaust component 65 is HEPA filtered before exiting the glovebox 20. A pipe 90 connects the air exhaust plenum 105 to the airlock component 40. A manual valve 70 controls the flow of air through the exhaust component 65. Pipes 90 and 115 have an in-line NEPA filter (not shown), whereby all air entering the airlock component 40 through pipe 115 is HEPA filtered, and all air exiting the airlock component 40 is HEPA filtered prior to entering plenum 105.

A control panel 51 is positioned adjacent to the airlock component 40 and comprises a pressure monitor 50 and a pressure controller 52 (further shown in FIG. 3) that is operatively connected to the glovebox 20, and uses a pressure sensor 54 (further shown in FIG. 3) to measure the pressure inside the glovebox 20. A valve assembly 100 is positioned on a support member 80 and further supports an automatic actuator 60. The automatic actuator 60 opens/closes the valve assembly 100 automatically either pneumatically or electrically.

The pressure sensor 54 measures the pressure in the glovebox 20 and sends a signal of the pressure in glovebox 20 to the pressure controller 52. The pressure monitor 50 displays the pressure readings. The pressure controller 52 responds according to the pressure signal. If the pressure reaches the setpoint, the pressure controller 52 actuates an external device 135, such as relay or solenoid, which, in turn, actuates the automatic actuator 60 either pneumatically or electrically to close the valve assembly 100. Once pressure is restored in the glovebox 20, the automatic actuator 60 returns to its original position prior to closure. The automatic valve assembly 100 is normally closed, but during operation is open and is controlled by the pressure controller 52 and is closed in case the pressure in the glovebox 20 increases above the set limit. The automated valve assembly 100 is configured to respond quickly and the pressure within the glovebox 20 is continuously monitored such that the automatic actuator 60 activates and the valve assembly 100 closes when the pressure increases above the set limit. An example of an automatic valve, which could be used in accordance with the embodiments herein is a Top Line SRS 50, 3" Bio-Pro™ Forged Automated Diaphragm Valve, available from Top Line Process Equipment, Pennsylvania, USA.

Conventionally, the air intake for the glovebox 20 is open to the room and can be shut off with the manual valve 55. However, the time of response is critical when working with very hazardous materials and is completely dependent on the operator's response time. The introduction of the automatic actuator 60 eliminates the risk associated with the operation of shutting down the glovebox 20 in the event of pressure loss.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A glovebox air intake emergency safety shutoff system comprising:
    a first manual valve configured to operatively connect to a glovebox, wherein said first manual valve articulates between an open position and a closed position;
    an automatic valve operatively connected to said manual valve, wherein said automatic valve articulates between an open position and a closed position;
    an air intake component configured to input air into said glovebox;
    an air exhaust component configured to discharge air from said glovebox; and
    a pressure monitor configured to detect a level of pressure in said glovebox.

2. The system of claim 1, wherein said pressure monitor comprises:
    a pressure sensor configured to measure a pressure in said glovebox and transmit a signal associated with the measured pressure; and
    a pressure controller that receives said signal and responds according to said measured pressure.

3. The system of claim 2, wherein said pressure controller operatively closes said automatic valve upon said measured pressure increasing above a predetermined limit.

4. The system of claim 3, wherein said pressure controller uses an external device to actuate said automatic valve.

5. The system of claim 4, wherein said external device comprises any of a relay and a solenoid.

6. The system of claim 4, wherein said automatic valve closes pneumatically or electrically.

7. The system of claim 6, wherein said automatic valve opens upon said measured pressure reaching said predetermined limit.

8. The system of claim 1, further comprising an airlock component configured to operatively connect to said glovebox.

9. The system of claim 8, further comprising a plurality of pipes configured to operatively connect each of said air intake component and said air exhaust component to any of said glovebox and said airlock component.

10. The system of claim 1, further comprising:
    an air inlet plenum operatively connected to said air intake component; and
    an air exhaust plenum operatively connected to said air exhaust component.

11. The system of claim 1, further comprising a second manual valve operatively connected to said air exhaust component.

12. The system of claim 10, further comprising:
    a third manual valve operatively connected to said air inlet plenum; and
    a fourth manual valve operatively connected to said air exhaust plenum.

13. An apparatus comprising:
    a negative pressurized glovebox;
    a support structure that holds said glovebox;
    an air inlet plenum operatively connected to said glovebox;
    a first manual valve operatively connected to said air inlet plenum, wherein said first manual valve articulates between an open position and a closed position;
    an automatic valve operatively connected to said manual valve, wherein said automatic valve articulates between an open position and a closed position;
    an air intake component that inputs air into said negative pressurized glovebox;
    an air exhaust component that discharges air from said negative pressurized glovebox;
    a pressure sensor that measures a pressure in said glovebox and transmits a signal associated with the measured pressure;
    a pressure controller that receives said signal and responds according to said measured pressure; and
    an external device operatively connected to said pressure controller, wherein said external device operatively closes said automatic valve upon said measured pressure increasing above a predetermined limit.

14. The apparatus of claim 13, wherein said external device comprises any of a relay and a solenoid.

15. The apparatus of claim 13, wherein said external device closes said automatic valve pneumatically or electrically.

16. The apparatus of claim 13, wherein said external device opens said automatic valve upon said measured pressure reaching said predetermined limit.

17. The apparatus of claim 13, further comprising an airlock component operatively connected to said glovebox.

18. The apparatus of claim 17, further comprising a plurality of pipes operatively connecting each of said air intake component and said air exhaust component to any of said glovebox and said airlock component.

19. The apparatus of claim 13, further comprising an air exhaust plenum operatively connected to said glovebox and said air exhaust component, wherein said air inlet plenum is operatively connected to said air intake component.

20. The apparatus of claim 19, further comprising:
    a third manual valve operatively connected to said air inlet plenum; and
    a fourth manual valve operatively connected to said air exhaust plenum.

* * * * *